US009810811B2

(12) United States Patent
Marshall et al.

(10) Patent No.: US 9,810,811 B2
(45) Date of Patent: *Nov. 7, 2017

(54) PREDICTING THE POTENTIAL FOR SEVERE WEATHER

(71) Applicant: Earth Networks, Inc., Germantown, MD (US)

(72) Inventors: Robert S. Marshall, Ijamsville, MD (US); Christopher Dale Sloop, Mount Airy, MD (US); Benjamin E. Beroukhim, Rockville, MD (US); Chonglin Liu, Rockville, MD (US); Stan Heckman, Chelmsford, MA (US); Mark A. Hoekzema, Germantown, MD (US)

(73) Assignee: Earth Networks, Inc., Germantown, MD (US)

( * ) Notice: Subject to any disclaimer, the term of this patent is extended or adjusted under 35 U.S.C. 154(b) by 553 days.

This patent is subject to a terminal disclaimer.

(21) Appl. No.: 14/458,174

(22) Filed: Aug. 12, 2014

(65) Prior Publication Data
US 2015/0134252 A1 May 14, 2015

Related U.S. Application Data

(63) Continuation of application No. 13/177,266, filed on Jul. 6, 2011, now Pat. No. 8,836,518.

(51) Int. Cl.
*G01W 1/16* (2006.01)
*G01W 1/02* (2006.01)
(Continued)

(52) U.S. Cl.
CPC ............. *G01W 1/16* (2013.01); *G01W 1/02* (2013.01); *G01W 1/10* (2013.01);
(Continued)

(58) Field of Classification Search
CPC .......... G01W 1/10; G01W 1/16; G01W 1/02; G01W 2203/00; G08B 21/10; G08G 1/0967
See application file for complete search history.

(56) References Cited

U.S. PATENT DOCUMENTS 2,864,081 A 12/1958 Steelman
3,121,296 A 2/1964 Ekstrom
(Continued)

FOREIGN PATENT DOCUMENTS

JP 2005257639 A 9/2005
JP 2005274321 A 10/2005
(Continued)

OTHER PUBLICATIONS (C7) Office Action from corresponding China patent application No. 201280040397.6; dated Jun. 30, 2015; 30 pages.
(Continued)

*Primary Examiner* — Mohamed Barakat
(74) *Attorney, Agent, or Firm* — Proskauer Rose LLP

(57) ABSTRACT

Methods and apparatuses, including computer program products, are described for predicting the potential for severe weather. A computing device receives data associated with lightning activity, where the data includes lightning flash data. The computing device identifies cells of lighting activity based upon the lightning flash data and determines a movement speed, a movement direction, and a lightning rate of the cells of lightning activity based on the received data. The computing device compares the determined lightning rate to a threshold lightning rate, where the threshold rate is set based upon atmospheric conditions in a location of the cells of lightning activity. The computing device determines one or more geographical areas at risk based on the location, the movement speed, and the movement direction of the cells of lightning activity, and issues an alert to remote
(Continued)

devices when the lightning rate exceeds a value of the threshold lightning rate.

23 Claims, 5 Drawing Sheets

(51) Int. Cl.
*G01W 1/10* (2006.01)
*G08G 1/0967* (2006.01)
*G08B 21/10* (2006.01)

(52) U.S. Cl.
CPC ......... *G01W 2203/00* (2013.01); *G08B 21/10* (2013.01); *G08G 1/0967* (2013.01)

(56) References Cited

U.S. PATENT DOCUMENTS

| | | | |
|---|---|---|---|
| 3,772,594 A | 11/1973 | Kuehnast | |
| 4,543,580 A | 9/1985 | Bent et al. | |
| 4,792,806 A | 12/1988 | Bent et al. | |
| 4,801,942 A | 1/1989 | Markson et al. | |
| 4,812,852 A | 3/1989 | Bent et al. | |
| 4,901,564 A | 2/1990 | Williams et al. | |
| 4,914,444 A | 4/1990 | Pifer et al. | |
| 4,916,455 A | 4/1990 | Bent et al. | |
| 4,972,195 A | 11/1990 | Markson et al. | |
| 4,996,473 A * | 2/1991 | Markson | G01S 5/0009 324/72 |
| 5,036,334 A | 7/1991 | Henderson et al. | |
| 5,057,820 A | 10/1991 | Markson et al. | |
| 5,140,523 A | 8/1992 | Frankel et al. | |
| 5,153,508 A | 10/1992 | Blakeslee et al. | |
| 5,295,071 A | 3/1994 | Kuzma et al. | |
| 5,295,072 A | 3/1994 | Stevens et al. | |
| 5,299,127 A | 3/1994 | Stevens et al. | |
| 5,303,152 A | 4/1994 | Moses et al. | |
| 5,305,210 A | 4/1994 | Kuzma et al. | |
| 5,319,553 A | 6/1994 | Gregg et al. | |
| 5,325,299 A | 6/1994 | Moses et al. | |
| 5,396,220 A | 3/1995 | Markson et al. | |
| 5,537,318 A | 7/1996 | Moses et al. | |
| 5,699,245 A | 12/1997 | Herold | |
| 5,771,020 A | 6/1998 | Markson et al. | |
| 6,064,340 A | 5/2000 | Croft et al. | |
| 6,246,367 B1 | 6/2001 | Markson et al. | |
| 6,298,118 B1 | 10/2001 | Liggett | |
| 6,420,862 B2 | 7/2002 | Medelius et al. | |
| 6,552,521 B1 | 4/2003 | Medelius et al. | |
| 6,559,242 B1 | 7/2003 | Splett et al. | |
| 6,768,946 B2 | 7/2004 | Okabe et al. | |
| 6,788,043 B2 | 9/2004 | Murphy et al. | |
| 6,791,311 B2 | 9/2004 | Murphy et al. | |
| 6,791,482 B2 | 9/2004 | Koyanagi | |
| 6,868,339 B2 | 3/2005 | Murphy et al. | |
| 7,266,345 B2 | 9/2007 | Park | |
| 7,327,271 B2 | 2/2008 | Greenstein et al. | |
| 7,460,956 B2 | 12/2008 | Murphy et al. | |
| 7,672,783 B2 | 3/2010 | Oettinger | |
| 7,788,036 B1 | 8/2010 | Neilley et al. | |
| 7,868,811 B1 | 1/2011 | Woodell et al. | |
| 7,869,953 B1 | 1/2011 | Kelly et al. | |
| 7,917,291 B2 * | 3/2011 | Havin | G01W 1/10 702/1 |
| 7,970,542 B2 | 6/2011 | Bent et al. | |
| 8,073,622 B2 | 12/2011 | Said et al. | |
| 8,275,548 B2 * | 9/2012 | Marshall | G01R 29/0842 324/72 |
| 8,519,860 B2 | 8/2013 | Johnson et al. | |
| 8,698,640 B1 | 4/2014 | Gropper | |
| 2001/0048297 A1 | 12/2001 | Medelius et al. | |
| 2002/0026284 A1 | 2/2002 | Brown | |
| 2003/0107490 A1 | 6/2003 | Sznaider et al. | |
| 2003/0151398 A1 | 8/2003 | Murphy et al. | |
| 2003/0187580 A1 | 10/2003 | Okabe et al. | |
| 2004/0204854 A1 | 10/2004 | Murphy et al. | |
| 2005/0197070 A1 | 9/2005 | Kaikuranta et al. | |
| 2005/0251711 A1 | 11/2005 | Murphy et al. | |
| 2007/0087697 A1 * | 4/2007 | Coersmeier | G01W 1/16 455/67.13 |
| 2007/0156339 A1 | 7/2007 | Oettinger | |
| 2007/0214023 A1 * | 9/2007 | Mathai | G01W 1/00 705/4 |
| 2007/0260151 A1 | 11/2007 | Clifford | |
| 2008/0085096 A1 | 4/2008 | Marshall | |
| 2008/0262732 A1 | 10/2008 | Davis et al. | |
| 2009/0164124 A1 * | 6/2009 | Ryan | G01W 1/16 702/4 |
| 2009/0177343 A1 | 7/2009 | Bunch et al. | |
| 2009/0281730 A1 | 11/2009 | Said et al. | |
| 2009/0295587 A1 | 12/2009 | Gorman | |
| 2010/0218209 A1 | 8/2010 | Kendall | |
| 2011/0040483 A1 | 2/2011 | Marshall et al. | |
| 2011/0090111 A1 | 4/2011 | Stagliano, Jr. | |
| 2011/0153742 A1 * | 6/2011 | Sloop | G01C 21/3691 709/204 |

FOREIGN PATENT DOCUMENTS

| | | |
|---|---|---|
| WO | 9705508 | 2/1997 |
| WO | 9705508 A2 | 2/1997 |

OTHER PUBLICATIONS (C8) European Search report from corresponding European patent application No. 12807081.0; dated Jun. 1, 2015; 6 pages.
(C9) Notice of Reasons for Refusal issued from JP Patent Office from corresponding Japanese patent application No. 2014-518625; dated Mar. 15, 2016; 12 pages.
(C1) Schmidt, K. et al., "A Comparative Analysis of Lightning Data During the EU-Brazil TROCCINOX / TroCCiBras Campaign," VIII International Symposium on Lightning Protection, (Nov. 21-25, 2005), 6 pgs.
(C2) Betz, H.D. et al., "LINET—An international lightning detection network in Europe," Atmos. Res., (2008), 10 pgs.
(C3) Betz, H.D. et al., "Cell-tracking with lightning data from LINET," Adr. Geosci., 17, 55-61, (2008), 7 pgs.
(C4) International Search Report from related PCT patent application No. PCT/US12/42966, dated Sep. 4, 2012, 10 pages.
(C5) Non-Final Office Action from corresponding patent application (U.S. Appl. No. 13/177,266), dated Dec. 4, 2013, 30 pages.
(C6) Notice of Allowance from corresponding patent application (U.S. Appl. No. 13/177,266), dated Jun. 4, 2014, 17 pages.

* cited by examiner

PREDICTING THE POTENTIAL FOR SEVERE WEATHER

RELATED APPLICATIONS

This application is a continuation of U.S. patent application Ser. No. 13/177,266, filed on Jul. 6, 2011, which is incorporated herein in its entirety.

FIELD OF THE INVENTION

The subject matter of this application relates generally to methods and apparatuses, including computer program products, for predicting the potential for severe weather.

BACKGROUND

Lightning includes electrical discharges within a cloud, intracloud (IC) discharges, and cloud to ground (CG) discharges. Lightning occurs when electrical fields within a cloud intensify as particles of opposite polarity collect at differing regions within the cloud. Lightning begins with an initial electrical breakdown (i.e., a pulse) followed by leader channels from which a series of channel branches grow within a cloud forming a comprehensive branch channel structure. For IC lightning, the channel structure remains within the cloud. A CG discharge occurs when one or more branches extend from a cloud to the ground.

An increase in lightning activity often precedes even more severe weather phenomena, such as severe storms, tornadoes, hail, damaging downburst winds and potentially deadly cloud-to-ground lightning strikes. In addition, such lightning activity frequently occurs in localized clusters, also called cells. Lightning cells exhibit certain characteristics (e.g., lightning rate, IC/CG ratio) that are indicative of the potential for severe weather. Also, using detection methods and systems, data associated with lightning cells can be obtained and analyzed to determine the location and movement of specific cells across a geographic region.

Accurate and efficient detection of early lightning activity, such as the weaker, initial IC discharges, is critical for advanced forecasting of severe weather phenomena. Integrated detection of both IC lightning and CG lightning provides highly advanced predictive capabilities for characterizing severe storm precursors, improving lead times and comprehensive weather management planning. Numerous lightning detection systems and methods have been developed, each striving to determine the location, movement, frequency and intensity of lightning activity with better accuracy. Examples of such systems include the U.S. Precision Lightning Network (USPLN), the National Lightning Detection Network (NLDN) and the WeatherBug Total Lightning Network (WTLN).

Previous weather alert systems have relied on human intervention to determine the extent of severe weather activity and to initiate the notification of remote devices configured to receive alerts (e.g., through use of a display where a person evaluates weather data and select devices to receive the alerts). To increase the speed and accuracy of weather alert systems, it is desirable to eliminate the need for manual processing of severe weather data and issuance of alert messages.

SUMMARY

An important objective associated with accurate, advanced detection of severe weather activity is the timely issuance of automated warnings or alerts to entities that may be affected by the severe weather. More exact detection of atmospheric conditions that potentially result in severe weather, such as lightning rates, leads to a more comprehensive understanding of the risk for dangerous weather activity in a particular geographic area. Knowledge of severe weather potential before that severe weather impacts a particular region allows for greater lead time for alerts to persons or entities situated in proximity to the at-risk areas, resulting in increased safety for those persons and entities.

In general overview, the techniques described herein are related to predicting the potential for severe weather. The techniques advantageously provide automated severe storm prediction for the timely issuance of reliable severe weather alerts. The techniques utilize precise detection of lightning events such as CG and IC lightning flashes to identify the boundaries of lightning cells. The techniques also account for differences in geographic location and atmospheric conditions to produce more accurate predictions of the track and timing of severe weather. The techniques further provide for automatic identification of remote devices configured to receive alerts for a particular geographic area and automatic transmission of relevant alerts to the remote devices.

The invention, in one aspect, features a computer-implemented method for predicting the potential for severe weather. A computing device receives data associated with lightning activity, where the data includes lightning flash data collected during a specific time interval. The computing device identifies one or more cells of lighting activity based upon the lightning flash data. The computing device determines a movement speed, a movement direction, and a lightning rate of the one or more cells of lightning activity based on the received data. The computing device compares the determined lightning rate to a threshold lightning rate, where the threshold lightning rate is set based upon atmospheric conditions in a location of the one or more cells of lightning activity. The computing device determines one or more geographical areas at risk based on the location, the movement speed, and the movement direction of the one or more cells of lightning activity. The computing device issues an alert to one or more remote devices monitoring the geographical areas at risk when the lightning rate exceeds a value of the threshold lightning rate.

The invention, in another aspect, features a system for predicting the potential for severe weather. The system includes a computing device configured to receive data associated with lightning activity, where the data includes lightning flash data collected during a specific time interval. The computing device is configured to identify one or more cells of lighting activity based upon the lightning flash data and determine a movement speed, a movement direction, and a lightning rate of the one or more cells of lightning activity based on the received data. The computing device is configured to compare the determined lightning rate to a threshold lightning rate, where the threshold lightning rate is set based upon atmospheric conditions in a location of the one or more cells of lightning activity. The computing device is configured to determine one or more geographical areas at risk based on the location, the movement speed, and the movement direction of the one or more cells of lightning activity, and issue an alert to one or more remote devices monitoring the geographical areas at risk when the lightning rate exceeds a value of the threshold lightning rate.

The invention, in another aspect, features a computer program product, tangibly embodied in a non-transitory computer readable storage device, for predicting the potential for severe weather. The computer program product includes instructions operable to cause a computing device to receive data associated with lightning activity, wherein the data includes lightning flash data collected during a specific time interval. The computer program product includes instructions operable to cause the computing device to identify one or more cells of lighting activity based upon the lightning flash data and determine a movement speed, a movement direction, and a lightning rate of the one or more cells of lightning activity based on the received data. The computer program product includes instructions operable to cause the computing device to compare the determined lightning rate to a threshold lightning rate, where the threshold lightning rate is set based upon atmospheric conditions in a location of the one or more cells of lightning activity. The computer program product includes instructions operable to cause the computing device to determine one or more geographical areas at risk based on the location, the movement speed, and the movement direction of the one or more cells of lightning activity, and issue an alert to one or more remote devices monitoring the geographical areas at risk when the lightning rate exceeds a value of the threshold lightning rate.

The invention, in another aspect, features a computer-implemented method for predicting the potential for severe weather. A computing device receives data associated with lightning activity, where the data includes lightning flash data collected during a specific time interval. The computing device identifies one or more cells of lighting activity based upon the lightning flash data and determines a movement speed, a movement direction, and a lightning rate of the one or more cells of lightning activity based on the received data. The computing device compares the determined lightning rate to a threshold lightning rate and determines a probability of severe weather based on lightning characteristics including the determined lightning rate. The computing device determines one or more geographical areas at risk based on the location, the movement speed, and the movement direction of the one or more cells of lightning activity, and issues an alert to one or more remote devices monitoring the geographical areas at risk when the lightning rate exceeds a value of the threshold lightning rate.

The invention, in another aspect, features a system for predicting the potential for severe weather. The system includes a computing device configured to receive data associated with lightning activity, where the data includes lightning flash data collected during a specific time interval. The computing device is configured to identify one or more cells of lighting activity based upon the lightning flash data and determine a movement speed, a movement direction, and a lightning rate of the one or more cells of lightning activity based on the received data. The computing device is configured to compare the determined lightning rate to a threshold lightning rate and determine a probability of severe weather based on lightning characteristics including the determined lightning rate. The computing device is configured to determine one or more geographical areas at risk based on the location, the movement speed, and the movement direction of the one or more cells of lightning activity, and issue an alert to one or more remote devices monitoring the geographical areas at risk when the lightning rate exceeds a value of the threshold lightning rate.

The invention, in another aspect, features a computer program product, tangibly embodied in a non-transitory computer readable storage device, for predicting the potential for severe weather. The computer program product includes instructions operable to cause a computing device to receive data associated with lightning activity, where the data includes lightning flash data collected during a specific time interval. The computer program product includes instructions operable to cause the computing device to identify one or more cells of lighting activity based upon the lightning flash data and determine a movement speed, a movement direction, and a lightning rate of the one or more cells of lightning activity based on the received data. The computer program product includes instructions operable to cause the computing device to compare the determined lightning rate to a threshold lightning rate and determine a probability of severe weather based on lightning characteristics including the determined lightning rate. The computer program product includes instructions operable to cause the computing device to determine one or more geographical areas at risk based on the location, the movement speed, and the movement direction of the one or more cells of lightning activity, and issue an alert to one or more remote devices monitoring the geographical areas at risk when the lightning rate exceeds a value of the threshold lightning rate.

Any of the above aspects can include one or more of the following features. In some embodiments, the atmospheric conditions include at least one of: a vertical temperature profile, a vertical moisture profile, a vertical wind profile, and a ground truth severe weather report. In some embodiments, the ground truth reports of severe weather include real-time observational evidence of severe weather. In some embodiments, the computing device adjusts the threshold lightning rate based upon changes to the atmospheric conditions.

In some embodiments, the threshold lightning rate is set based on historical evidence associated with a time of year and the threshold lightning rate is adjusted based upon the atmospheric conditions. In some embodiments, the lightning rate is determined based on a number of lightning events per minute associated with the one or more cells of lightning activity.

In some embodiments, the step of identifying one or more cells of lighting activity based upon the lightning flash data comprises positioning each lightning flash on a map according to its geographic location, superimposing a first grid on the map and identifying sectors of the first grid with a high density of lightning flashes, superimposing a second grid on the identified sectors of the map to locate closed contours associated with a lightning cell, and generating a convex polygon from each of the closed contours. In some embodiments, one or more polygons are generated corresponding to the geographical areas at risk. In some embodiments, the generated polygons are positioned on a map in which at least one of the geographical areas at risk is located. In some embodiments, the generated polygons are transmitted to the one or more remote devices as part of the alert.

In some embodiments, the data associated with lightning activity is received from one or more geographically dispersed sensor devices. In some embodiments, the alert is issued before severe weather has reached at least one of the geographical areas at risk.

In some embodiments, the step of determining a probability of severe weather is based on a ratio of in-cloud lightning activity in the lightning flash data to cloud-to-ground lightning activity in the lightning flash data. In some embodiments, the step of determining a probability of severe weather is based on total charge moment of lightning in the lightning flash data. In some embodiments, the step of determining a probability of severe weather is based on at least one of: an average amplitude of lightning in the lightning flash data and a media amplitude of lightning in the lightning flash data. In some embodiments, the step of determining a probability of severe weather is based on a total charge transfer of lightning in the lightning flash data. In some embodiments, the total charge transfer of lightning increases as amplitude and/or duration of lightning in the lightning flash data increases. In some embodiments, the step of determining a probability of severe weather is based on a ratio of total positive flashes in the lightning flash data to total negative flashes in the lightning flash data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
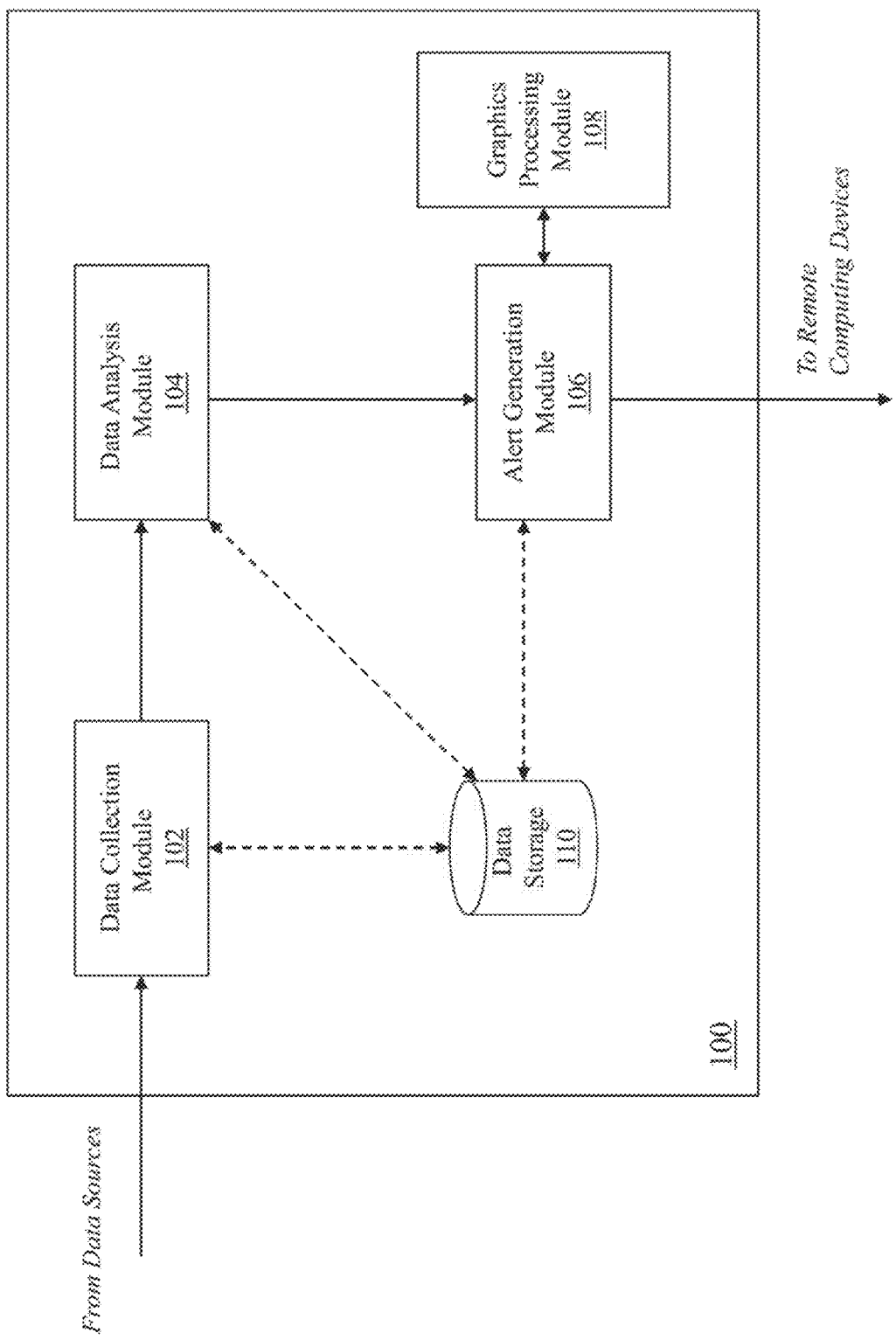
FIG. 1 is a block diagram of a system for predicting the potential for severe weather.

FIG. 1 is a block diagram of a system 100 for predicting the potential for severe weather. The system 100 includes a data collection module 102, a data analysis module 104, an alert generation module 106, a graphics processing module 108, and a data storage module 110. In some embodiments, the components (e.g., 100, 102, 104, 106, 108 and 110) of the system 100 reside at the same physical location or may be dispersed to different physical locations. In some embodiments, the components of the system 100 are located on the same physical device (e.g., a server computing device), or are distributed on different physical devices. The components of the system 100 communicate, for example, via a communications network (e.g., WAN, LAN, VLAN).

Figure 2:
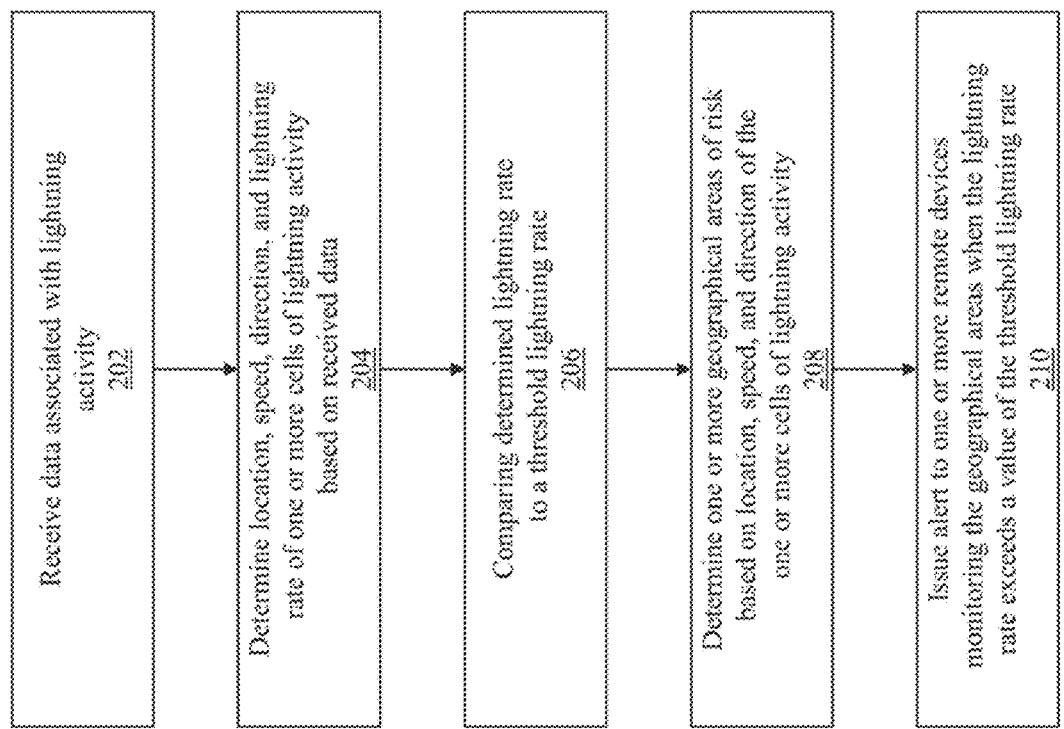
FIG. 2 is a flow diagram of a method for predicting the potential for severe weather using the system.

FIG. 2 is a flow diagram of a method 200 for predicting the potential for severe weather using the system 100. The data collection module 102 receives (202) data associated with lightning activity. The data analysis module 104 determines (204) a location, a movement speed, a movement direction and a lightning rate of one or more cells of lightning activity based on the data received by the data collection module 102. The data analysis module 104 compares (206) the determined lightning rate to a threshold lightning rate. The alert generation module 106 determines (208) one or more geographical areas at risk based on the location, the movement speed, the movement direction of the one or more cells of lightning activity. The alert generation module 106 issues (210) an alert to one or more remote devices monitoring the geographical areas at risk when the determined lightning rate exceeds a value of the threshold lightning rate.

The data collection module 102 provides an interface between external data sources (not shown) and the data analysis module 104 of the system 100. The data collection module 102 receives data associated with lightning activity from various external data collection and/or monitoring systems. For example, the data collection module 102 receives data from a lightning detection system comprising a plurality of geographically-dispersed weather sensors (e.g., the WeatherBug Total Lightning Network (WTLN)). In this example, the data collected by the weather sensors includes analog radio frequency (RF) energy (e.g., pulses or flashes) at different frequencies, as emitted by a lightning discharge. Additional detail regarding detection of lightning activity and collection of lightning activity data is found in U.S. patent application Ser. No. 12/542,404, titled "Method and Apparatus for Detecting Lightning Activity," which is incorporated herein in its entirety. Other sources of lightning activity information include, but are not limited to, governmental agencies and third-party private companies. The data collection module 102 communicates with the various external data systems and sources via standard communications networks and methods.

The data collection module 102 also consolidates lightning activity data received from a plurality of external data sources into a format conducive for processing by the data analysis module 104. For example, each data source to which the data collection module 102 is connected may transmit data using a different syntax and/or data structure. The data collection module 102 parses the incoming data according to an understanding of the source of the data and reformat the data so that it conforms to a syntax or structure acceptable to the data analysis module 104. In some embodiments, the external data sources transmit the lightning activity data in a standard format (e.g., XML) to reduce the processing required of the data collection module 102. The data collection module 102 communicates with the data storage module 110 to save and retrieve data received from external sources in preparation for transmitting the data to the data analysis module 104. Once the data has been received, the data collection module 102 transmits the data to the data analysis module 104. In some embodiments, the data collection module 102 transmits a notification to the data analysis module 104 that the data has been stored in the data storage module 110 and is ready for processing by the data analysis module 104. The notification includes a reference indicator (e.g., a database address) of the storage location of the data within the data storage module 110.

The data analysis module 104 processes the lightning activity data received by the data collection module 102 and/or stored in the data storage module 110 to determine the existence of severe weather risk to one or more geographic regions.

The data analysis module 104 determines the severe weather risk to one or more geographic regions by tracking the location, movement speed, movement direction and lightning rate of one or more cells of lightning activity based on the data received by the system 100. A lightning cell is a cluster of flashes with a boundary as a polygon determined by the flash density value for a given time period. The data analysis module 104 groups the collected flash data into lightning cells, and the data analysis module 104 correlates the cell polygons over a period of time to determine the movement direction (i.e., track) of the cells. In addition, the data analysis module 104 counts the number of flashes in a particular lightning cell to determine the lightning flash rate (e.g., flashes per minute). The data analysis module 104 further calculates the movement speed and location of the lightning cells.

Figure 3:
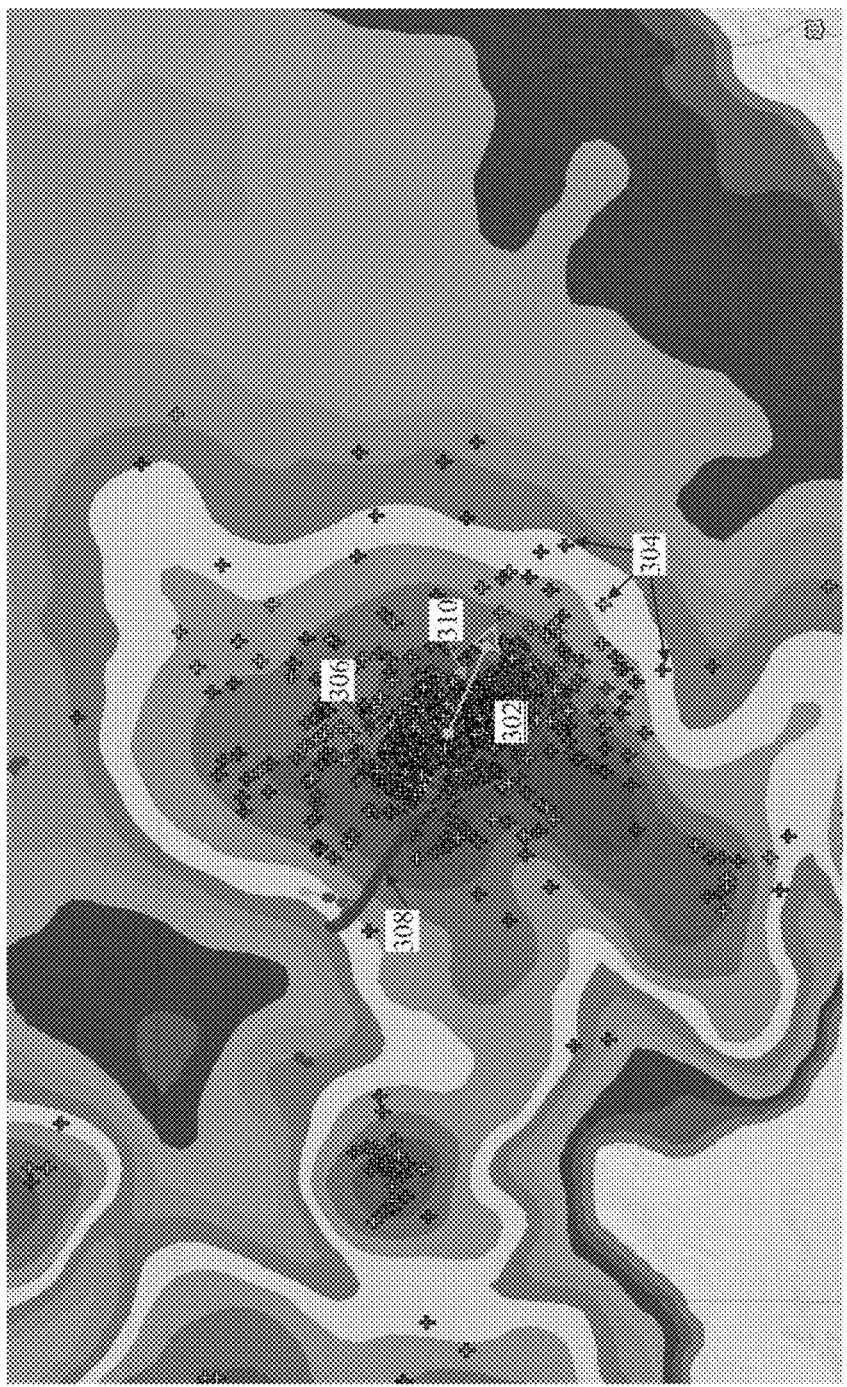
FIG. 3 is a diagram depicting the identification of a lightning cell by the system 100 based on the lightning activity data

FIG. 3 is a diagram depicting the identification of a lightning cell 302 by the system 100 based on the lightning activity data. The data analysis module 104 receives the lightning flash data from the data collection module 102 and positions each lightning flash (e.g., lightning flashes 304) according to its geographic location. The data analysis module 104 then analyzes the relative position of the lightning flashes to determine the potential boundaries or contours of specific lightning cells (e.g., cell 302).

In some embodiments, the data analysis module 104 executes a series of gridding processes to determine the location and contours of a lightning cell 302. The data analysis module 104 uses the lightning flash data collected during a specific time period (e.g., one minute) and places the lightning flashes (e.g., flashes 304) on a map. The data analysis module 104 then superimposes a coarse grid on the map to quickly locate areas of interest for further analysis. The data analysis module 104 identifies the sectors of the grid that contain a high percentage or density of lightning flashes and superimposes a fine grid on the identified sectors. The data analysis module 104 employs density functions on the sectors of the fine grid to locate closed contours associated with the lightning cell 302. The data analysis module 104 generates a convex polygon (e.g., convex polygon 306) from each of the closed contours.

The data analysis module 104 repeats this gridding process at the expiration of a specific time period (e.g., one minute) in order to track changes in movement, direction and lightning flash rate of the lightning cell 302. In most cases, the polygon 306 generated by the data analysis module 104 for a particular lightning cell at each time interval is similar to the previously-generated polygon for that cell, so the data analysis module 104 efficiently and quickly correlates the two polygons. However, in the case of a sharp increase in the lightning flash rate, lightning cell split or lightning cell merger, the correlation of subsequent polygons for a particular cell is not obvious. The data analysis module 104 links the individual lightning cell polygons based on the dynamically-changing data to produce a path 308 of the moving lightning cell. For example, when a lightning cell regroups after weakening, based on the trajectory of the cell and the time-distance of two polygons, the data analysis module 104 maintains a continuous cell path 308.

The data analysis module 104 also compares the lightning flash rate calculated from the received lightning activity data to a threshold lightning rate. The data analysis module 104 also monitors the rate changes associated with the lightning flash rate of the identified lightning cells. By monitoring the flash rates and the rate changes, severe storm cells (and cells that potentially will become severe) are identified and tracked. The threshold lightning rate used by the data analysis module 104 is relevant to the probability that the tracked lightning cell is associated with severe weather and may be used by the system 100 to determine when to issue an alert. For example, if the lightning rate exceeds the threshold rate, the possibility that the lightning cell is associated with severe weather is sufficient to warrant the issuance of an alert.

Figure 4:
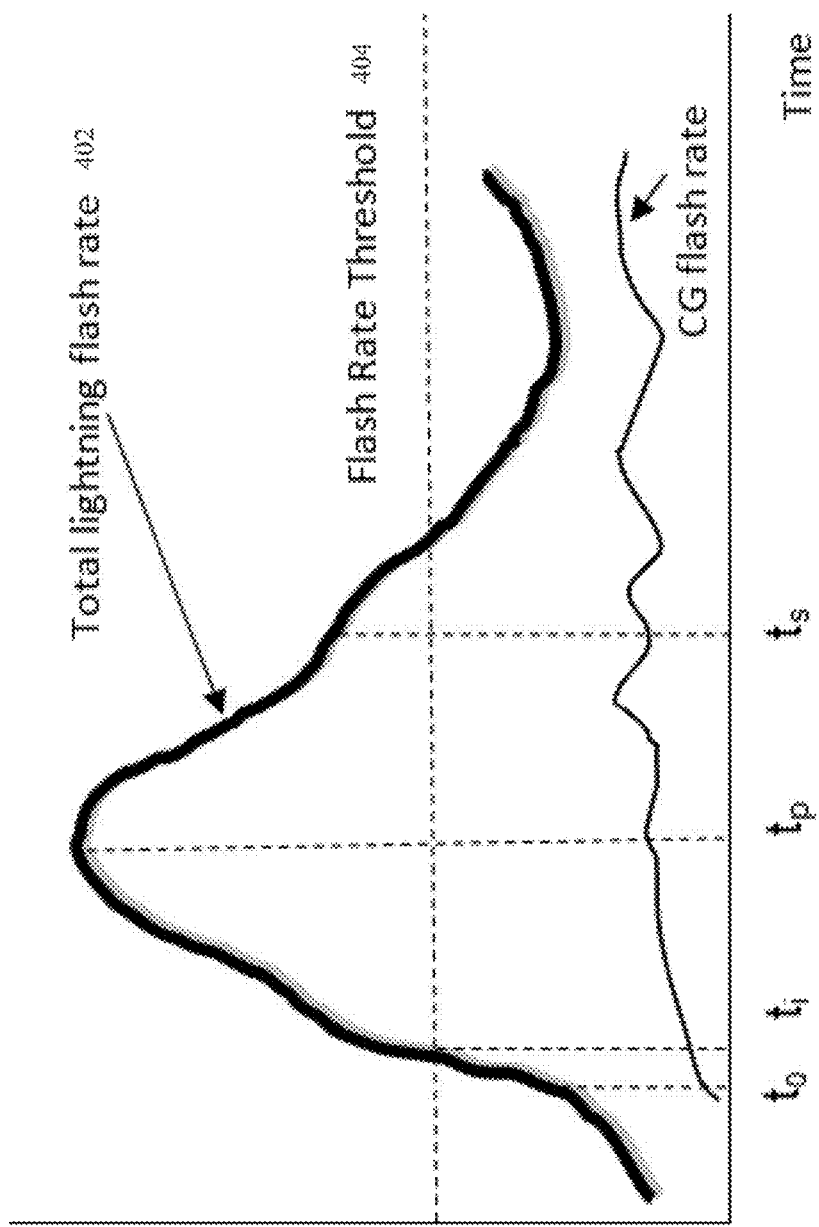
FIG. 4 is a graph depicting the total lightning rate of an individual lightning cell in comparison with a lightning threshold rate over a specific period of time.

FIG. 4 is a graph 400 depicting the total lightning rate 402 of an individual lightning cell (e.g., cell 302 of FIG. 3) in comparison with a lightning threshold rate 404 over a specific period of time. The data analysis module 104 determines the total lightning rate 402 of a lightning cell by analyzing the number of lightning events (e.g., flashes) in a specific time interval (e.g., one minute). In some embodiments, lightning events include both CG and IC lightning. In some embodiments the data analysis module 104 evaluates the collected lightning data to identify various types of IC lightning, including air discharges, intracloud flashes, and/or cloud-to-ionosphere flashes.

By continuously calculating the total lightning rate of a particular lightning cell at regular time intervals, the data analysis module 104 detects changes in the total lightning rate between the time intervals. Based on this approach, the data analysis module 104 determines if changes in the lightning rate have occurred that may be indicative of severe weather generally or a specific type of severe weather (e.g., precipitation, wind events). For example, the total lightning rate 402 in FIG. 4 begins to increase sharply starting at time=t(0) and peaking at time=t(p), with the severe weather associated with the lightning cell occurring at time=t(s). The data analysis module 104 determines that the total lightning rate 402 meets the threshold lightning rate 304 at time=t(i) and transmits information to the alert generation module 106. In addition, the data analysis module 104 compares the changes in rate between time=t(0), time=t(p) and time=t(s) against a database of historical lightning rate activity to identify similarities or patterns in the lightning rate change. As an example, the specific rate changes depicted in FIG. 4 may occur multiple times during the life of a lightning cell, and the severe weather resulting at time=t(s) may be the onset of an intense hail storm. As a result, the data analysis module 104 instructs the alert generation module 106 to provide a more detailed alert message based on this additional information.

The data analysis module 104 also uses the historical data to set a threshold rate for a specific lightning cell. For example, the data analysis module 104 determines the threshold lightning rate by using a best-fit analysis method based on review of actual weather data. In some embodiments, the historical data is associated with a particular time of year and/or a particular geographic region. Based on a correlation between the historical time of year and the time of year during which the current lightning cell is being tracked, the data analysis module 104 adjusts the threshold rate to account for similarities or differences between the two data points. For example, if a lightning cell is being tracked during a time of year that has exhibited traditionally low occurrence of severe weather, the data analysis module 104 moves the threshold rate up to require a higher total lightning rate before an alert is issued by the system 100. Conversely, if a lightning cell is being tracked during a time of year that has been prone to increased severe weather activity, the data analysis module 104 moves the threshold rate down to require a lower total lightning rate before issuance of an alert.

Once the data analysis module 104 determines that the total lightning rate of the currently-tracked lightning cell (e.g., cell 302 of FIG. 3) has exceeded the threshold lightning rate (i.e., is associated with a sufficient potential for severe weather), the data analysis module 104 transmits data to the alert generation module 106. The alert generation module 106 uses the analyzed characteristics of the lightning cell to automatically determine geographical areas that may be impacted by the lightning cell as it moves and changes in size and/or intensity.

Figure 5:
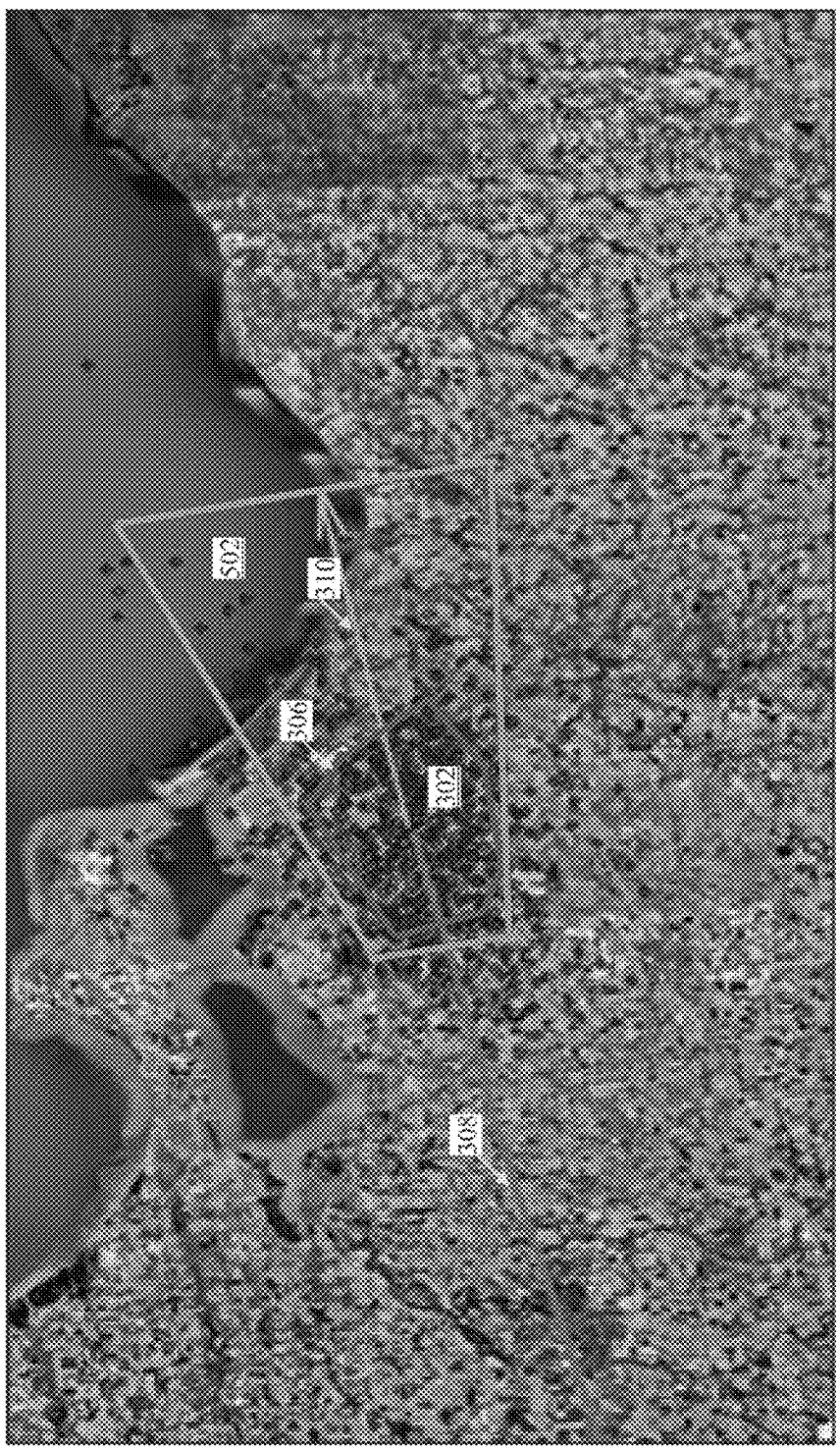
FIG. 5 is a diagram depicting the identification by the system of a geographical area at risk of severe weather based on the lightning activity data.

FIG. 5 is a diagram 500 depicting the identification by the system 100 of a geographical area at risk 502 of severe weather based on the lightning activity data. In order to issue an alert that reaches persons and/or entities that may be directly affected by the severe weather or that may have an interest in the affected area, the alert generation module 106 determines one or more geographical areas at risk 502 based on the location, movement speed and movement direction of the lightning cell 302. In some embodiments, the alert generation module 106 determines a warning area that corresponds to the current location and expected track of the cell during an upcoming period of time. For example, the alert generation module 106 generates a polygon 502 that covers the range of distances and directions that a lightning cell could travel in a specific period of time (e.g., forty-five minutes) by evaluating the movement speed and the movement direction of the cell demonstrated at the time the data analysis module 104 determines that the total lightning rate of the cell 302 exceeded the threshold lightning rate.

After receiving notification from the data analysis module 104 and determining one or more areas at risk, the alert generation module 106 automatically identifies a set of one or more remote devices that are monitoring the at-risk areas and automatically transmits an alert to the remote devices. The remote devices can include computer-based devices, such as mobile phones and global positioning system (GPS) hardware. The remote devices can also include other types of warning systems, such as lights, sirens and horns that are configured to connect to a communications network. In some embodiments, the data storage device 110 includes information related to identification of the remote devices (e.g., IP address, phone number, email address), and the alert generation module 108 uses the identification information to prepare an alert for each remote device. The data storage device 110 also includes information mapping the identification of a remote device to a particular geographic area or areas that the remote device is monitoring (e.g., zip code, county name, street address). The alert generation module 106 uses any standard communication protocol or technique, such as packet-based delivery (e.g., text messaging, XML, email), circuit-based delivery (e.g., paging, voice messaging), and the like. For example, a user can subscribe to receive alerts for a particular zip code on his mobile phone. The system 100 stores the user's telephone number in the data storage module 110. When the alert generation module 106 identifies a geographic location that is at risk for severe weather and all or part of the identified location falls within the zip code submitted by the user, the alert generation module 108 issues an alert (e.g., a text message, a voice message) addressed to the telephone number of the user's mobile phone. In this embodiment, the user's mobile phone need not be located in the same geographic area as identified by the alert generation module 106 as "at risk."

In some embodiments, the alert is further enhanced by the inclusion of a graphical representation of the geographical area that is under the threat of severe weather. The graphical representation provides an additional, easily recognizable piece of information for the recipient of the alert. For example, the alert generation module 106 superimposes a polygon 502 delineating the geographical area at risk associated with a specific lightning cell 302 on a map. The alert generation module 106 utilizes a graphics processing module 108 to generate a visual representation of the polygon 502 representing the at-risk area as placed on the map. In some embodiments, the graphics processing module 108 is a separate graphics processing unit (GPU) (e.g., a graphics card) or a software module configured to produce graphic drawings and designs based on the lighting activity data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computer-implemented method for predicting the potential for severe weather, the method comprising:
   receiving, by a computing device, data associated with lightning activity, wherein the data includes lightning flash data collected during a specific time interval;
   identifying, by the computing device, one or more cells of lighting activity based upon the lightning flash data, comprising:
      positioning each lightning flash on a map according to its geographic location;
      superimposing a first grid on the map and identifying sectors of the first grid with a high density of lightning flashes;
      superimposing a second grid on the identified sectors of the map to locate closed contours associated with a lightning cell; and
      generating a convex polygon from each of the closed contours;
   determining, by the computing device, a movement speed, a movement direction, and a lightning rate of the one or more cells of lightning activity based on the received data;
   generating, by the computing device, a threshold lightning rate for each of the one or more cells of lightning activity by correlating present atmospheric conditions in a location of the one or more cells of lightning activity with historical atmospheric conditions in the location of the one or more cells of lightning activity;
   comparing, by the computing device, the determined lightning rate to the threshold lightning rate;
   determining, by the computing device, one or more geographical areas at risk based on the location, the movement speed, and the movement direction of the one or more cells of lightning activity; and
   issuing, by the computing device, an alert to one or more remote devices monitoring the geographical areas at risk when the determined lightning rate exceeds the threshold lightning rate.

2. The method of claim 1, wherein the present atmospheric conditions and the historical atmospheric conditions include at least one of: a vertical temperature profile, a vertical moisture profile, a vertical wind profile, or a ground truth severe weather report.

3. The method of claim 2, wherein the ground truth reports of severe weather include real-time observational evidence of severe weather.

4. The method of claim 1, further comprising adjusting, by the computing device, the threshold lightning rate based upon changes to the present atmospheric conditions.

5. The method of claim 1, wherein the historical atmospheric conditions are associated with a time of year.

6. The method of claim 1, wherein the lightning rate is determined based on a number of lightning events per minute associated with the one or more cells of lightning activity.

7. The method of claim 1, further comprising generating, by the computing device, one or more polygons corresponding to the geographical areas at risk.

8. The method of claim 7, further comprising positioning, by the computing device, the generated polygons on a map in which at least one of the geographical areas at risk is located.

9. The method of claim 7, further comprising transmitting, by the computing device, the generated polygons to the one or more remote devices as part of the alert.

10. The method of claim 1, further comprising receiving, by the computing device, the data associated with lightning activity from one or more geographically dispersed sensor devices.

11. The method of claim 1, further comprising issuing, by the computing device, the alert before severe weather has reached at least one of the geographical areas at risk.

12. A system for predicting the potential for severe weather, the system comprising a computing device configured to:
receive data associated with lightning activity, wherein the data includes lightning flash data collected during a specific time interval;
identify one or more cells of lighting activity based upon the lightning flash data comprising:
positioning each lightning flash on a map according to its geographic location;
superimposing a first grid on the map and identifying sectors of the first grid with a high density of lightning flashes;
superimposing a second grid on the identified sectors of the map to locate closed contours associated with a lightning cell; and
generating a convex polygon from each of the closed contours;
determine a movement speed, a movement direction, and a lightning rate of the one or more cells of lightning activity based on the received data;
generate a threshold lightning rate for each of the one or more cells of lightning activity by correlating present atmospheric conditions in a location of the one or more cells of lightning activity with historical atmospheric conditions in the location of the one or more cells of lightning activity;
compare the determined lightning rate to the threshold lightning rate;
determine one or more geographical areas at risk based on the location, the movement speed, and the movement direction of the one or more cells of lightning activity; and
issue an alert to one or more remote devices monitoring the geographical areas at risk when the determined lightning rate exceeds the threshold lightning rate.

13. The system of claim 12, wherein the present atmospheric conditions and the historical atmospheric conditions include at least one of: a vertical temperature profile, a vertical moisture profile, a vertical wind profile, or a ground truth severe weather report.

14. The system of claim 13, wherein the ground truth reports of severe weather include real-time observational evidence of severe weather.

15. The system of claim 12, wherein the computing device is further configured to adjust the threshold lightning rate based upon changes to the present atmospheric conditions.

16. The system of claim 12, wherein the historical atmospheric conditions are associated with a time of year.

17. The system of claim 12, wherein the computing device determines the lightning rate based on a number of lightning events per minute associated with the one or more cells of lightning activity.

18. The system of claim 12, wherein the computing device generates one or more polygons corresponding to the geographical areas at risk.

19. The system of claim 18, wherein the computing device positions the generated polygons on a map in which at least one of the geographical areas at risk is located.

20. The system of claim 18, wherein the computing device transmits the generated polygons to the one or more remote devices as part of the alert.

21. The system of claim 12, wherein the computing device receives the data associated with lightning activity from one or more geographically dispersed sensor devices.

22. The system of claim 12, wherein the computing device issues the alert before severe weather has reached at least one of the geographical areas at risk.

23. A computer program product, tangibly embodied in a non-transitory computer readable storage device, for predicting the potential for severe weather, the computer program product including instructions operable to cause a computing device to:
receive data associated with lightning activity, wherein the data includes lightning flash data collected during a specific time interval;
identify one or more cells of lighting activity based upon the lightning flash data, comprising:
positioning each lightning flash on a map according to its geographic location;
superimposing a first grid on the map and identifying sectors of the first grid with a high density of lightning flashes;
superimposing a second grid on the identified sectors of the map to locate closed contours associated with a lightning cell; and
generating a convex polygon from each of the closed contours;
determine a movement speed, a movement direction, and a lightning rate of the one or more cells of lightning activity based on the received data;
generate a threshold lightning rate for each of the one or more cells of lightning activity by correlating present atmospheric conditions in a location of the one or more cells of lightning activity with historical atmospheric conditions in the location of the one or more cells of lightning activity;
compare the determined lightning rate to the threshold lightning rate;
determine one or more geographical areas at risk based on the location, the movement speed, and the movement direction of the one or more cells of lightning activity; and
issue an alert to one or more remote devices monitoring the geographical areas at risk when the determined lightning rate exceeds the threshold lightning rate.

* * * * *